(12) United States Patent
Schmidt et al.

(10) Patent No.: US 9,949,306 B2
(45) Date of Patent: Apr. 17, 2018

(54) COMMUNICATION TERMINAL DEVICE, COMMUNICATION DEVICE, COMMUNICATION NETWORK SERVER AND METHOD FOR CONTROLLING

(71) Applicant: INTEL DEUTSCHLAND GMBH, Neubiberg (DE)

(72) Inventors: Andreas Schmidt, Braunschweig (DE); Maik Bienas, Schöppenstedt (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 0 days.

(21) Appl. No.: 15/145,370

(22) Filed: May 3, 2016

(65) Prior Publication Data

US 2016/0278154 A1    Sep. 22, 2016

Related U.S. Application Data

(63) Continuation of application No. 14/609,364, filed on Jan. 29, 2015, now Pat. No. 9,380,625, which is a
(Continued)

(51) Int. Cl.
*H04M 1/00* (2006.01)
*H04W 88/06* (2009.01)
(Continued)

(52) U.S. Cl.
CPC ......... *H04W 76/023* (2013.01); *H04J 11/003* (2013.01); *H04W 4/008* (2013.01);
(Continued)

(58) Field of Classification Search
CPC .... H04W 88/06; H04W 88/10; H04W 76/023
(Continued)

(56) References Cited

U.S. PATENT DOCUMENTS 6,510,146 B1    1/2003    Korpela et al.
8,902,855 B2    12/2014   Etemad et al.
(Continued)

FOREIGN PATENT DOCUMENTS

CN    1732651 A      2/2006
CN    101588582 A    11/2009
(Continued)

OTHER PUBLICATIONS

European Patent Office; Office Action for Application No. 14702199.2 dated Oct. 4, 2016; 7 pages.
(Continued)

*Primary Examiner* — Lee Nguyen
(74) *Attorney, Agent, or Firm* — Schwabe, Williamson & Wyatt, P.C.

(57) ABSTRACT

In various aspects of this disclosure, a communication terminal device may be provided. The communication terminal device may include a cellular wide area radio communication technology circuit. The cellular wide area radio communication technology circuit may be configured to provide a communication according to a cellular wide area radio communication technology. The communication terminal device may further include a circuit. The circuit may be configured to provide a direct communication terminal device to communication terminal device communication bypassing a radio access network according to information received via the radio access network. The communication terminal device may further include a message generator. The message generator may be configured to generate a message to transmit to a base station. The message may include at least one message field specifying information about at least one capability to provide the direct communication terminal device to communication terminal device communication of the communication terminal device. The
(Continued)

message may be generated for a network communication protocol.

20 Claims, 10 Drawing Sheets

Related U.S. Application Data continuation of application No. 13/779,864, filed on Feb. 28, 2013, now Pat. No. 8,989,807.

(51) Int. Cl.
| | |
|---|---|
| H04W 76/02 | (2009.01) |
| H04W 4/22 | (2009.01) |
| H04J 11/00 | (2006.01) |
| H04W 4/00 | (2018.01) |
| H04W 72/04 | (2009.01) |
| H04W 72/08 | (2009.01) |
| H04W 4/02 | (2018.01) |
| H04W 48/18 | (2009.01) |

(52) U.S. Cl.
CPC .............. *H04W 4/02* (2013.01); *H04W 4/22* (2013.01); *H04W 48/18* (2013.01); *H04W 72/048* (2013.01); *H04W 72/082* (2013.01); *H04W 88/06* (2013.01)

(58) Field of Classification Search
USPC ........................................ 455/552.1; 370/338
See application file for complete search history.

(56) References Cited

U.S. PATENT DOCUMENTS

| | | | |
|---|---|---|---|
| 8,989,807 | B2 | 3/2015 | Schmidt et al. |
| 2004/0077374 | A1 | 4/2004 | Terry |
| 2004/0121766 | A1 | 6/2004 | Benson et al. |
| 2005/0036469 | A1 | 2/2005 | Wentink |
| 2007/0004404 | A1 | 1/2007 | Buckley et al. |
| 2007/0076608 | A1 | 4/2007 | Samuel et al. |
| 2007/0097945 | A1 | 5/2007 | Wang et al. |
| 2008/0075035 | A1 | 3/2008 | Eichenberger |
| 2008/0205345 | A1 | 8/2008 | Sachs et al. |
| 2008/0273500 | A1 | 11/2008 | Suh |
| 2009/0141684 | A1 | 6/2009 | Hashimoto et al. |
| 2009/0180451 | A1 | 7/2009 | Alpert et al. |
| 2009/0286542 | A1 | 11/2009 | Gideon et al. |
| 2010/0009675 | A1 | 1/2010 | Wijting et al. |
| 2010/0120397 | A1 | 5/2010 | Kazmi et al. |
| 2010/0142433 | A1 | 6/2010 | Womack et al. |
| 2010/0165882 | A1 | 7/2010 | Palanki et al. |
| 2010/0197304 | A1 | 8/2010 | Sawhney et al. |
| 2010/0248715 | A1 | 9/2010 | Lundsgaard et al. |
| 2010/0261469 | A1 | 10/2010 | Ribeiro et al. |
| 2011/0038318 | A1 | 2/2011 | Parsons et al. |
| 2011/0082940 | A1 | 4/2011 | Montemurro et al. |
| 2011/0117907 | A1 | 5/2011 | Hooli et al. |
| 2011/0211521 | A1 | 9/2011 | Baba et al. |
| 2011/0222424 | A1 | 9/2011 | Abishek et al. |
| 2011/0244800 | A1 | 10/2011 | Bogestam et al. |
| 2011/0258327 | A1 | 10/2011 | Phan et al. |
| 2012/0172045 | A1 | 7/2012 | Fukuta |
| 2012/0213183 | A1 | 8/2012 | Chen et al. |
| 2012/0230244 | A1 | 9/2012 | Bienas et al. |
| 2012/0252498 | A1 | 10/2012 | Trinchero et al. |
| 2013/0034082 | A1 | 2/2013 | Etemad et al. |
| 2013/0184024 | A1 | 7/2013 | Chen et al. |
| 2013/0316727 | A1 | 11/2013 | Edge |
| 2014/0004796 | A1* | 1/2014 | Cakulev .............. H04W 76/023 455/41.2 |
| 2014/0328287 | A1 | 11/2014 | Etemad et al. |
| 2014/0335791 | A1* | 11/2014 | Kim ...................... H04W 4/008 455/41.2 |
| 2017/0180974 | A1 | 6/2017 | Bienas et al. |

FOREIGN PATENT DOCUMENTS

| | | |
|---|---|---|
| CN | 102685770 A | 9/2012 |
| CN | 104980991 A | 10/2015 |
| DE | 102012101863 A1 | 9/2012 |
| EP | 1328093 A1 | 7/2003 |
| EP | 1881725 A1 | 1/2008 |
| HK | 1194890 A | 10/2014 |
| JP | 1175237 A1 | 3/1999 |
| WO | 2004103008 A1 | 11/2004 |
| WO | 2010006650 A1 | 1/2010 |
| WO | 2013012371 A1 | 1/2013 |
| WO | 2013019816 A1 | 2/2013 |
| WO | 2013163599 A2 | 10/2013 |

OTHER PUBLICATIONS

US Patent and Trademark Office; Office Action for U.S. Appl. No. 15/150,657 dated Jul. 21, 2016; 22 pages.
US Patent and Trademark Office; Office Action for U.S. Appl. No. 13/043,606 dated Nov. 2, 2015; 26 pages.
US Patent and Trademark Office; Notice of Allowance for U.S. Appl. No. 14/335,338 dated Feb. 3, 2016; 9 pages.
European Patent Office; Office Action for Patent Application No. 12820557.2 dated Apr. 4, 2017; 3 pages.
Chinese Patent Office; Office Action for Patent Application No. 201210060928.X dated Sep. 2, 2015; 13 pages.
3GPP TS 36.300 V10.7.0 (Mar. 2012); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 10); pp. 1-194.
3GPP TS 36.331 V10.5.0 (Mar. 2012); 3rd Generation Partnership Project; Technical Specification Group Radio Access Network; Evolved Universal Terrestrial Radio Access (E-UTRA); Radio Resource Control (RRC); Protocol specification; (Release 10); pp. 1-302.
3GPP TS 36.101 V10.6.0 (Mar. 2012); 3rd Generation Partnership Project; Technical Specification Group Radio Access Network; Evolved Universal Terrestrial Radio Access (E-UTRA); User Equipment (UE) radio transmission and reception (Release 10); pp. 1-312.
3GPP TR 22.803 V0.3.0 (May 2012); 3rd Generation Partnership Project; Technical Specification Group SA; Feasibility Study for Proximity (ProSe) (Release 12); pp. 1-24.
3GPP TS 36.306 V10.1.0 (Mar. 2011); 3rd Generation Partnership Project; Technical Specification Group Radio Access Network; Evolved Universal Terrestrial Radio Access (E-UTRA); User Equipment (UE) radio access capabilities; (Release 10); pp. 1-18.
3GPP TS 36.304 V10.5.0 (Mar. 2012); 3rd Generation Partnership Project; Technical Specification Group Radio Access Network; Evolved Universal Terrestrial Radio Access (E-UTRA); User Equipment (UE) procedures in idle mode (Release 10); p. 1-33.
3GPP TS 36.321 V10.5.0 (Mar. 2012); 3rd Generation Partnership Project; Technical Specification Group Radio Access Network; Evolved Universal Terrestrial Radio Access (E-UTRA); Medium Access Control (MAC) protocol specification.
3GPP TR 22.803 V1.0.0 (Aug. 2012); 3rd Generation Partnership Project; Technical Specification Group SA; Feasibility Study for Proximity (ProSe) (Release 12); pp. 1-33.
3GPP TS 36.306 V09.2.0 (Jun. 2010); 3rd Generation Partnership Project; Technical Specification Group Radio Access Network; Evolved Universal Terrestrial Radio Access (E-UTRA); User Equipment (UE) radio access capabilities; (Release 9); pp. 1-16.
International Search Report and Written Opinion in related PCT Application No. PCT/EP2014/050415, dated May 20, 2014, 11 pages.
International Bureau of WIPO; International Preliminary Report on Patentability for PCT App. No. PCT/US2012/049067, dated Feb. 13, 2014; 8 pages.
Korean Intellectual Property Office; International Search Report and Written Opinion for PCT App. No. PCT/US2012/049067, dated Feb. 27, 2013; 8 pages.

(56) References Cited

OTHER PUBLICATIONS

Hakola et al., "Device-to-Device (D2D) Communication in Cellular Network—Performance Analysis of Optimum and Practical Communication Mode Selection", Wireless Communications and Networking Conference (WCNC) 2010 IEEE, Apr. 2010.
Qualcomm News and Events—Press Releases; "Qualcomm to Demonstrate New Peer-to-Peer Technology at Mobile World Congress", Mobile World Congress 2011, printed Jun. 28, 2012, 2 pages.
3GPP, "Medium Access Control (MAC) Protocol Specification," 3rd Generation Partnership Project, Technical Specification Group Radio Access Network; Evolved Universal Terrestrial Radio Access (E-UTRA) (Release 10), 3GPP TS 36.321 V10.0.0, Dec. 2012, LTE Advanced, 53 pages.
3GPP, "Packet Data Convergence Protocol (PDCP) Specification"; 3rd Generation Partnership Project; Technical Specification Group Radio Access Network; Evolved Universal Terrestrial Radio Access (E-UTRA) (Release 10); 3GPP TS 36.323 V10.0.0, Dec. 2012, LTE Advanced; 24 pages.
3GPP; "Radio Link Control (RLC) Protocol Specification"; 3rd Generation Partnership Project; Technical Specification Group Radio Access Network; Evolved Universal Terrestrial Radio Access (E-UTRA) (Release 10); 3GPP TS 36.322 V10.0.0, Dec. 2012; LTE Advanced; 39 pages.
3GPP TS 36.331 v9.3.0 (Jun. 2010), 3rd Generation Partnership Project; Technical Specification Group Radio Access network; Evolved Universal Terrestrial Radio Access (E-UTRA); Radio Rescource Control (RRC); Protocol Specification (Release 9); pp. 1-250; http://www.3gpp.org/ftp/Specs/archive/36_series/36.331/36331-930.zip.
Chinese Patent Office; First Office Action; Chinese App. No. 20120060928, dated Mar. 4, 2014; 26 pages, Inclusive of English translation.
US Patent and Trademark Office; Office Action for U.S. Appl. No. 13/779,864 dated Jan. 28, 2014; 11 pages.
US Patent and Trademark Office; Notice of Allowance for U.S. Appl. No. 13/563,593 dated Sep. 3, 2014; 11 pages.
US Patent and Trademark Office; Office Action for U.S. Appl. No. 13/043,606 dated Feb. 14, 2013; 14 pages.
US Patent and Trademark Office; Office Action for U.S. Appl. No. 13/043,606 dated Jul. 15, 2013; 16 pages.
US Patent and Trademark Office; Office Action for U.S. Appl. No. 13/043,606 dated Jan. 16, 2014; 14 pages.
US Patent and Trademark Office; Office Action for U.S. Appl. No. 13/043,606 dated May 22, 2014; 16 pages.
US Patent and Trademark Office; Office Action for U.S. Appl. No. 14/335,338 dated Feb. 20, 2015; 26 pages.
Chinese Patent Office; Second Office Action; Chinese App. No. 20120060928, dated Dec. 18, 2014; 26 pages, inclusive of English translation.
European Patent Office; Extended European Search Report for EP App. No. 12820557.2 dated Mar. 11, 2015; 6 pages.
US Patent and Trademark Office; Office Action for U.S. Appl. No. 14/335,338 dated Jul. 16, 2015; 27 pages.
German Patent Office; Examination Report for German App. No. 102012101863.4, dated Jun. 30, 2015; 15 pages, inclusive of English translation.
US Patent and Trademark Office; Office Action for U.S. Appl. No. 13/043,606 dated Mar. 23, 2015; 14 pages.
US Patent and Trademark Office; Office Action for U.S. Appl. No. 13/043,606 dated Jul. 16, 2015; 13 pages.
European Patent Office; Office Action for Patent Application No. 14702199.2 dated Jun. 14, 2017; 9 pages.
Pragada et al.; "Method and Apparatus for Performing Device-to-Device (D2D) Service Advertising and Discovery," U.S. Appl. No. 61/639,386, filed Apr. 27, 2012; 69 pages.
Article 94(3) dated Oct. 18, 2017 from European Patent Application No. 12820557.2, 4 pages.
First Office Action dated Nov. 24, 2017 from Chinese Divisional Application No. 201510251687.0, 8 pages.

\* cited by examiner

COMMUNICATION TERMINAL DEVICE, COMMUNICATION DEVICE, COMMUNICATION NETWORK SERVER AND METHOD FOR CONTROLLING

CROSS REFERENCE TO RELATED APPLICATION

This application is a continuation of U.S. application Ser. No. 14/609,364, filed Jan. 29, 2015, which is a continuation of U.S. application Ser. No. 13/779,864, filed Feb. 28, 2013, now U.S. Pat. No. 8,989,807, issued Mar. 24, 2015, both of which are hereby incorporated by reference in their entireties.

TECHNICAL FIELD

The present disclosure relates to a communication terminal, a network component, a base station and a method for communicating.

BACKGROUND

Radio communication terminal devices may directly communicate with base stations in a cellular radio communication system. Furthermore, communication terminal devices that are furthermore provided with a short range wireless transceiver, may communicate directly with other communication terminal devices nearby bypassing the base station(s) of a cellular radio communication system.

Radio communication terminal devices (e.g. User Equipments (UEs)) that are residing in coverage of e.g. an LTE-FDD (Long Term Evolution Frequency Division Duplex) cell, and want to engage in a direct e.g. TDD-based (Time Division Duplex) UE-to-UE communication (D2D) in one of the frequency bands of the cell may be exposed to interference caused by traffic over the air interface (Uu interface) in the respective cell. At the same time, the D2D traffic over the UE-to-UE interface may also cause some, e.g. local interference for other UEs being served over the Uu interface.

SUMMARY

A communication terminal device may be provided. The communication terminal device may include a cellular wide area radio communication technology circuit. The cellular wide area radio communication technology circuit may be configured to provide a communication according to a cellular wide area radio communication technology. The communication may be a cellular wide area radio communication between the communication terminal device (e.g., a mobile device) and a communication device (e.g., a base station) of a cellular wide area radio communication network. The communication terminal device may further include a circuit. The circuit may be configured to provide a direct communication terminal device to communication terminal device communication bypassing a radio access network according to information received via the radio access network. The communication terminal device may further include a message generator. The message generator may be configured to generate a message for transmission to a base station. The message may include at least one message field specifying information about at least one capability to provide the direct communication terminal device to communication terminal device communication of the communication terminal device. The message may be generated for a network communication protocol.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
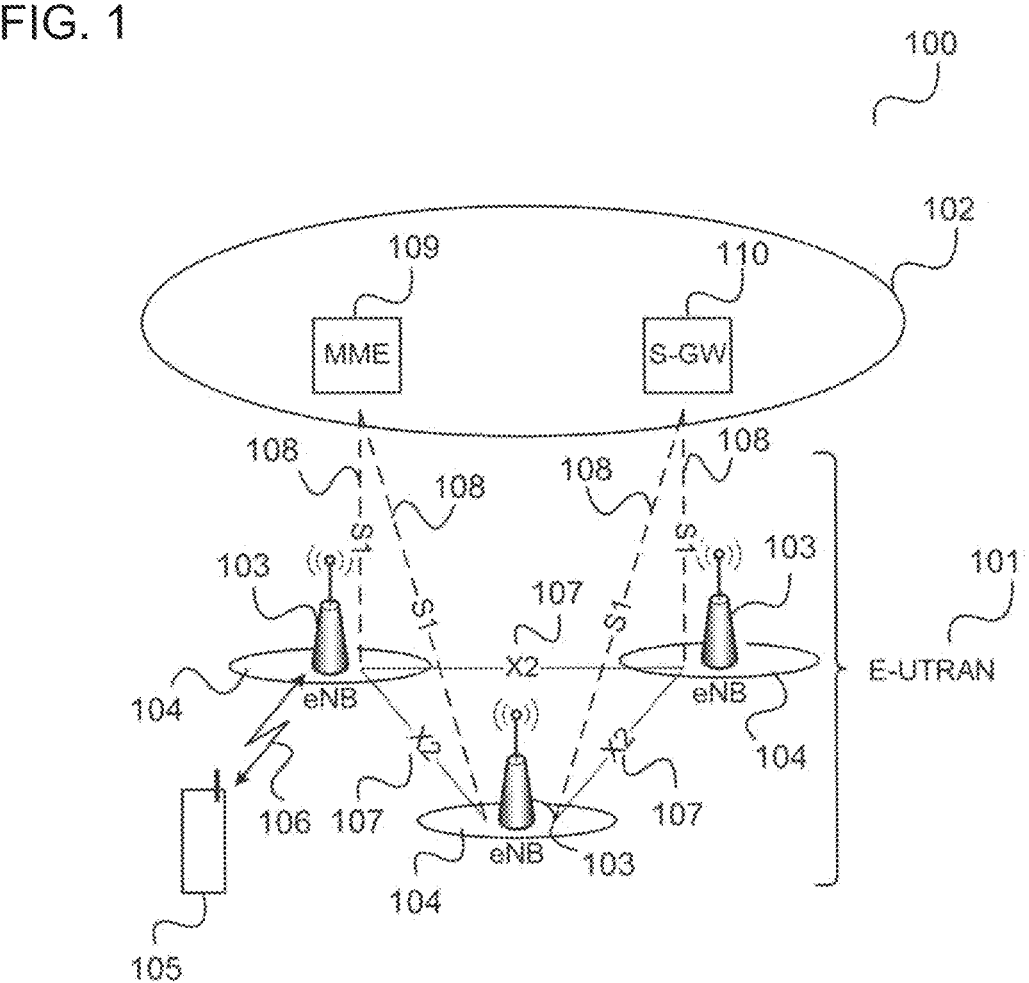
FIG. 1 shows a communication system.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The components of the communication device and/or the communication terminal device (e.g. the oscillator, the accuracy determiner, the signal detector, the controller) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The term "protocol" is intended to include any piece of software, that is provided to implement part of any layer of the communication definition. "Protocol" may include the functionality of one or more of the following layers: physical layer (layer 1), data link layer (layer 2), network layer (layer 3), or any other sub-layer of the mentioned layers or any upper layer.

The communication protocol layers and its respective entities which will be described in the following may be implemented in hardware, in software, in firmware, or partially in hardware, and/or partially in software, and/or partially in firmware. In an aspect of this disclosure, one or more communication protocol layers and its respective entities may be implemented by one or more circuits. In an aspect of this disclosure, at least two communication protocol layers may be commonly implemented by one or more circuits.

For reasons of simplicity, in the following, explanations will be given using LTE and the corresponding entities (e.g. E-UTRAN, EPC and UE), however, it is to be noted that various aspects may also be provided using another cellular wide area radio communication technology and its corresponding entities as will be described in more detail below.

3GPP (3rd Generation Partnership Project) has introduced LTE (Long Term Evolution) into the Release 8 version of UMTS (Universal Mobile Telecommunications System) standards.

The air interface of an LTE communication system is called E-UTRA (Evolved Universal Terrestrial Radio Access) and is commonly referred to as '3.9G'. In December 2010, the ITU (International Telecommunication Union) recognized that current versions of LTE and other evolved 3G technologies that do not fulfill "IMT-Advanced" (IMT: international mobile telecommunications) requirements could nevertheless be considered '4G', provided they represent forerunners to IMT-Advanced and "a substantial level of improvement in performance and capabilities with respect to the initial third generation systems deployed already. LTE is therefore sometime also referred to as '4G' (mainly for marketing reasons).

3GPP (3rd Generation Partnership Project) has introduced LTE-Advanced (i.e. LTE with some further enhancements, such as carrier aggregation functionality) into the Release 10 version of its suit of communication standards. This is the "real" '4G'.

In comparison with its predecessor UMTS (Universal Mobile Telecommunications System), LTE (Long Time Evolution) provides an air interface that has been further optimized for packet data transmission by improving the system capacity and the spectral efficiency. Among other enhancements, the maximum net transmission rate has been increased significantly, namely to 300 Mbps in the downlink transmission direction and to 75 Mbps in the uplink transmission direction. LTE supports scalable bandwidths of from 1.4 MHz to 20 MHz and is based on new multiple access methods, such as OFDMA (Orthogonal Frequency Division Multiple Access)/TDMA (Time Division Multiple Access) in downlink direction (tower, i.e. base station, to handset, i.e. mobile terminal) and SC-FDMA (Single Carrier-Frequency Division Multiple Access)/TDMA in uplink direction (handset to tower). OFDMA/TDMA is a multicarrier multiple access method in which a subscriber (i.e. a mobile terminal) is provided with a defined number of subcarriers in the frequency spectrum and a defined transmission time for the purpose of data transmission. The RF (Radio Frequency) capability of a mobile terminal according to LTE (also referred to as User Equipment (UE), e.g. a cell phone) for transmission and reception has been set to 20 MHz. A physical resource block (PRB) is the baseline unit of allocation for the physical channels defined in LTE. It includes a matrix of 12 subcarriers by 6 or 7 OFDMA/SC-FDMA symbols. At the physical layer a pair of one OFDMA/SC-FDMA symbol and one subcarrier is denoted as a 'resource element'.

A communication system that may be provided according to various aspects of this disclosure and which for example may be a communication system according to LTE is described in the following with reference to FIG. 1.

FIG. 1 shows a communication system 100.

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution)) 101 and a core network (e.g. an EPC, Evolved Packet Core, according LTE) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced).

A mobile terminal (e.g. UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data may be transmitted between a base station 103 and a mobile terminal 105 located in the mobile radio cell 104 operated by the base station 103 over the air interface 106 on the basis of a multiple access method. On the LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

An eNB 103 may for example host the following functions:

Functions for Radio Resource Management: Radio Bearer Control, Radio Admission Control, Connection Mobility Control, dynamic allocation of resources to UEs 105 in both uplink and downlink (scheduling);

IP header compression and encryption of user data stream;

Selection of an MME 109 at UE 105 attachment when no routing to an MME 109 can be determined from the information provided by the UE 105;

Routing of User Plane data towards Serving Gateway (S-GW) 110;

Scheduling and transmission of paging messages (originated from the MME);

Scheduling and transmission of broadcast information (originated from the MME 109 or O&M (Operation and Maintenance));

Measurement and measurement reporting configuration for mobility and scheduling;

Scheduling and transmission of PWS (Public Warning System, which includes ETWS (Earthquake and Tsunami Warning System) and CMAS (Commercial Mobile Alert System)) messages (originated from the MME 109); and CSG (Closed Subscriber Group) handling.

Each base station of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

As the mobile terminal 105 continues to move throughout the coverage area of the communication system 100, control of the call may be transferred between neighboring mobile radio cells 104. The transfer of calls from mobile radio cell 104 to mobile radio cell 104 is termed handover (or handoff).

A handover may also occur between base stations 103 operating according to different radio access technologies. This is illustrated in FIG. 2.

Figure 2:
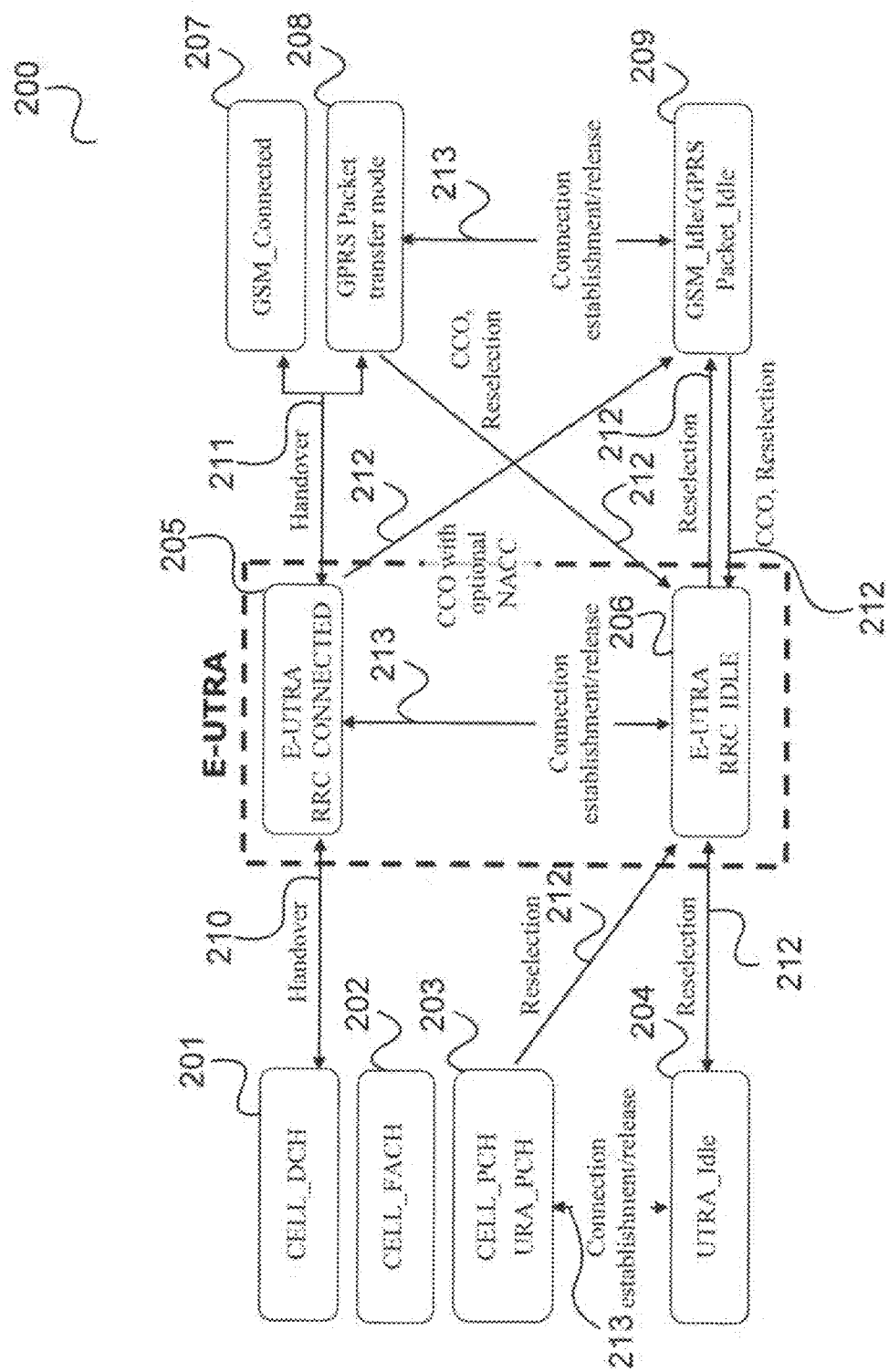
FIG. 2 shows a state diagram.

FIG. 2 shows a state diagram 200 for exemplary system in FIG. 1.

The state diagram 200 includes the UMTS (UTRA, 3G) mobile terminal states CELL_DCH 201, CELL_FACH 202, CELL_PCH/URA PCH 203, and UTRA_Idle 204, the LTE (E-UTRA) mobile terminal states RRC CONNECTED 205 and RRC IDLE 206 and the GSM (GERAN, 2G and 2.5G) mobile terminal states GSM_Connected 207, GPRS Packet Transfer Mode 208, and GSM_Idle/GPRS Packet_Idle 209. Contrary to UMTS, there are only two E-UTRA RRC states defined for the mobile terminal 105. FIG. 2 can be seen to illustrate the mobility support between E-UTRA, UTRA and GERAN.

According to a first state transition 210, a handover may be carried out between E-UTRA (i.e. a base station 103 operating according to LTE) and UTRAN (i.e. a base station 103 operating according to UTMS).

According to a second state transition 211, a handover may be carried out between E-UTRA (i.e. a base station 103 operating according to LTE) and GERAN (i.e. a base station 103 operating according to GSM).

Third state transitions 212 may occur between states of the UTRAN, the GERAN, and the E-UTRAN, e.g. in case of cell reselection without the handover of an active call. It should be noted that state transitions between states of the UTRAN and GERAN are omitted for simplicity but may also be possible.

Fourth state transitions 213 may occur between states of the same radio access technology, e.g. when a connection is released or a connection is established. The mobile terminal 105 is in RRC_CONNECTED when an RRC connection has been established. If this is not the case, i.e. no RRC connection is established, the mobile terminal 105 is in RRC_IDLE state.

The two RRC (Radio Resource Control) states RRC_IDLE and RRC_CONNECTED in E-UTRA can be described as follows:

RRC IDLE

Mobile terminal specific DRX (Discontinuous Reception) may be configured by upper protocol layers;

Mobility is controlled by the mobile terminal 105;

The mobile terminal 105 may acquire system information (SI);

monitors a paging channel to detect incoming calls and SI change;

performs neighboring cell measurements for the cell (re-)selection process.

RRC CONNECTED

A mobile terminal 105 is in RRC_CONNECTED when an RRC connection has been established.

Transfer of unicast data to/from the mobile terminal 105;

Mobility is controlled by the radio access network 101 (handover and cell change order);

The mobile terminal 105 may be configured with mobile terminal specific DRX (Discontinuous Reception) at lower protocol layers.

The mobile terminal 105 may acquire system information (SI);

monitors a paging channel and/or SIB (system information block) Type 1 content to detect SI change;

monitors control channels associated with the shared data channel to determine if data is scheduled for it;

performs neighboring cell measurements and measurement reporting to assist the network in making handover decisions;

provides channel quality and feedback information to the radio access network 101.

According to DRX the PDCCH (Physical Downlink Control Channel) monitoring activity of the mobile terminal 105 is controlled. On the PDCCH, various RNTIs (Radio Network Temporary Identifiers) can be found.

If the mobile terminal 105 is in RRC_IDLE state it is expected to listen to the P-RNTI (the so-called paging indicator) transmitted on the PDCCH which may announce the presence of a paging message on the PDSCH. If DRX is applied in RRC_IDLE, the mobile terminal 105 only needs to monitor one Paging Occasion (PO) per DRX cycle. System Information (SI) broadcast by the base station 103 controls DRX operation by specifying a mobile terminal specific paging cycle in SIB-Type2. (It should be noted that SIB (System Information Block)-Type 2 is received by all mobile terminals camping in a given radio cell, but the equation used by a mobile terminal 105 in RRC_IDLE state to calculate its individual Paging Occasion (PO) has as input variable the subscriber's (i.e. mobile terminal's) unique IMSI (International Mobile Subscriber Identity)).

If DRX is configured in RRC_CONNECTED for a mobile terminal 105, the mobile terminal 105 is allowed to monitor the PDCCH (Physical Downlink Control Channel) discontinuously (in order to save energy); otherwise the mobile terminal 105 monitors the PDCCH continuously. The RRC (Radio Resource Control) layer controls DRX operation by configuring timers and parameters, for example as shown in table 1.

TABLE 1 longDRX-CycleStartOffset
The value of longDRX-Cycle is in number of sub-frames. If shortDRX-Cycle is configured, the value of longDRX-Cycle shall be a multiple of the shortDRX-Cycle value. The value of drxStartOffset value is in number of sub-frames.
onDurationTimer
The value in number of PDCCH sub-frames.
drx-InactivityTimer
The value in number of PDCCH sub-frames.
drx-RetransmissionTimer
The value in number of PDCCH sub-frames.
shortDRX-Cycle
The value in number of sub-frames.
drxShortCycleTimer
The value in multiples of shortDRX-Cycle.

Figure 3:
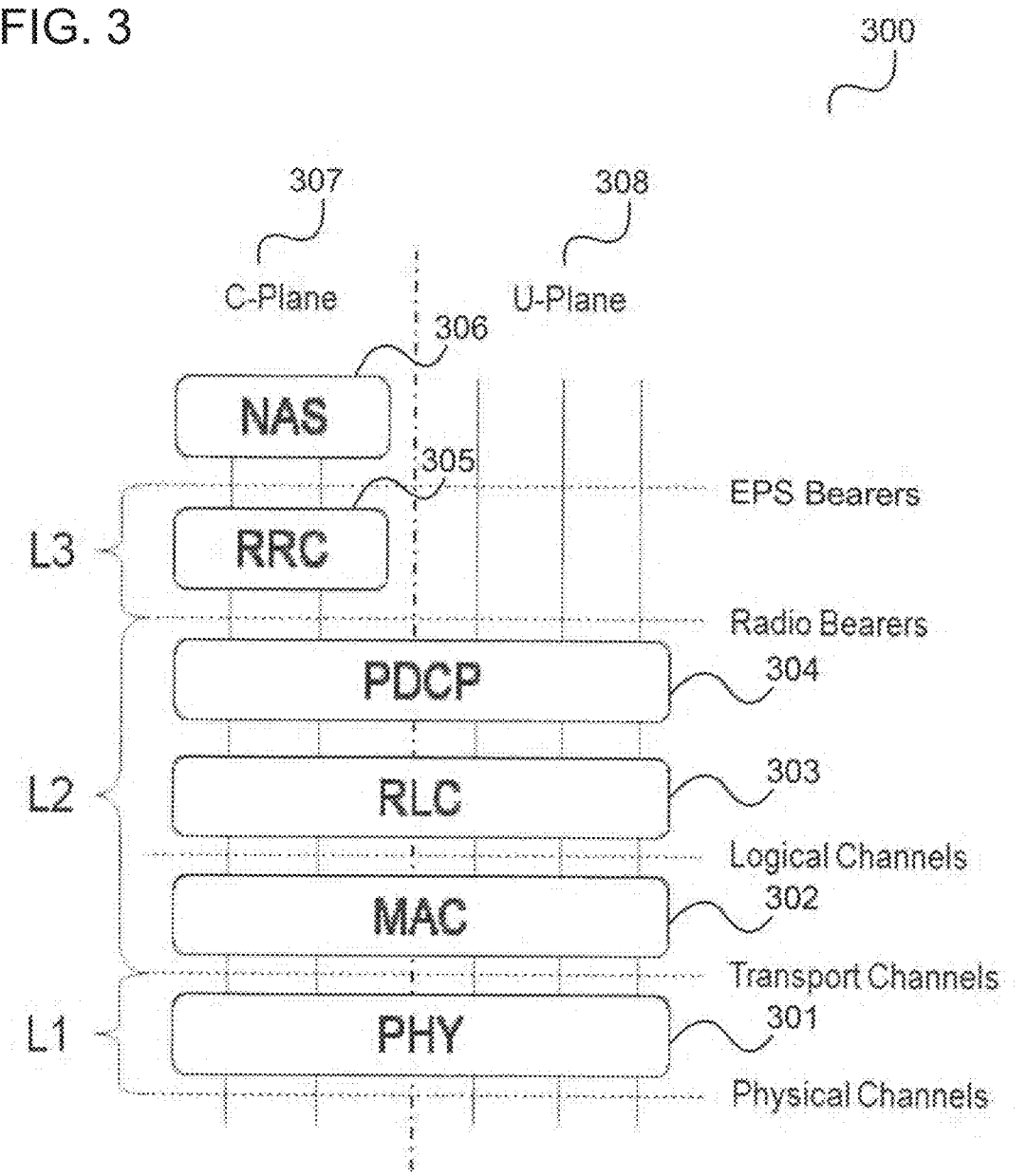
FIG. 3 shows a protocol structure.

The protocols for the C-Plane and the U-Plane of the E-UTRAN 101 according to LTE are illustrated in FIG. 3.

FIG. 3 shows a protocol structure 300 according to an aspect of this disclosure.

The LTE air interface (also referred to as Uu interface) is logically divided into three protocol layers. The entities ensuring and providing the functionality of the respective protocol layers are implemented both in the mobile terminal 105 and the base station 103. The bottommost layer is the physical layer (PHY) 301, which represents the protocol layer 1 (L1) according to the OSI (Open System Interconnection) reference model. The protocol layer arranged above PHY is the data link layer, which represents the protocol layer 2 (L2) according to the OSI reference model. In an LTE communication system, L2 consists of plurality of sublayers, namely the Medium Access Control (MAC) sublayer 302, the Radio Link Control (RLC) sublayer 303 and the Packet Data Convergence Protocol (PDCP) sublayer 304. The topmost layer of the Uu air interface is the network layer, which is the protocol layer 3 (L3) according to the OSI reference model and consists of the Radio Resource Control (RRC) layer 305 on the C-Plane 307. On the C-Plane 307, there is further the NAS (Non-Access Stratum) protocol layer 306.

Each protocol layer 301 to 306 provides the protocol layer above it with its services via defined service access points (SAPs). To provide a better understanding of the protocol layer architecture, the SAPs were assigned unambiguous names: The PHY 301 provides its services to the MAC layer 302 via transport channels, the MAC layer 302 provides its services to the RLC layer 303 via logical channels, and the RLC layer 303 provides its services to the RRC layer 305 and the PDCP layer 304 as data transfer as function of the RLC mode, i.e. TM (Transparent Mode), UM (Unacknowledged Mode) and AM (Acknowledged Mode). Further, the PDCP layer 304 provides its services to the RRC layer 305 and the U-Plane 308 upper layers via radio bearers, specifically as Signaling Radio Bearers (SRB) to the RRC 305 and as Data Radio Bearers (DRB) to the U-Plane 308 upper layers. According to LTE a maximum of 3 SRBs and 8 DRBs is currently supported.

The radio protocol architecture is not just split horizontally into the above-described protocol layers; it is also split vertically into the "control plane" (C-Plane) 307 and the "user plane" (U-Plane) 308. The entities of the control plane 307 are used to handle the exchange of signaling data between the mobile terminal 105 and the base station 103, which are required among other for the establishment, reconfiguration and release of physical channels, transport channels, logical channels, signaling radio bearers and data radio bearers, whereas the entities of the user plane 308 are used to handle the exchange of user data between the mobile terminal 105 and the base station 103. According to one aspect of this disclosure, according to LTE, each protocol layer has particular prescribed functions:

The PHY layer 301 is primarily responsible for i) error detection on the transport channel; ii) channel encoding/decoding of the transport channel; iii) Hybrid ARQ soft combining; iv) mapping of the coded transport channel onto physical channels; v) modulation and demodulation of physical channels.

The MAC layer 302 is primarily responsible for i) mapping between logical channels and transport channels; ii) error correction through HARQ; iii) logical channel prioritization; iv) transport format selection.

The RLC layer 303 is primarily responsible for i) error correction through ARQ, ii) concatenation, segmentation and reassembly of RLC SDUs (Service Data Unit); iii) re-segmentation and reordering of RLC data PDUs (Protocol Data Unit). Further, the RLC layer 303 is modeled such that there is an independent RLC entity for each radio bearer (data or signaling).

The PDCP layer 304 is primarily responsible for header compression and decompression of IP (Internet Protocol) data flows, ciphering and deciphering of user plane data and control plane data, and integrity protection and integrity verification of control plane data. The PDCP layer 304 is modeled such that each RB (i.e. DRB and SRB, except for SRB0) is associated with one PDCP entity. Each PDCP entity is associated with one or two RLC entities depending on the RB characteristic (i.e. uni-directional or bi-directional) and RLC mode.

The RRC layer 305 is primarily responsible for the control plane signaling between the mobile terminal 105 and the base station 103 and performs among other the following functions: i) broadcast of system information, ii) paging, iii) establishment, reconfiguration and release of physical channels, transport channels, logical channels, signaling radio bearers and data radio bearers. Signaling radio bearers are used for the exchange of RRC messages between the mobile terminal 105 and the base station 103.

Figure 4:
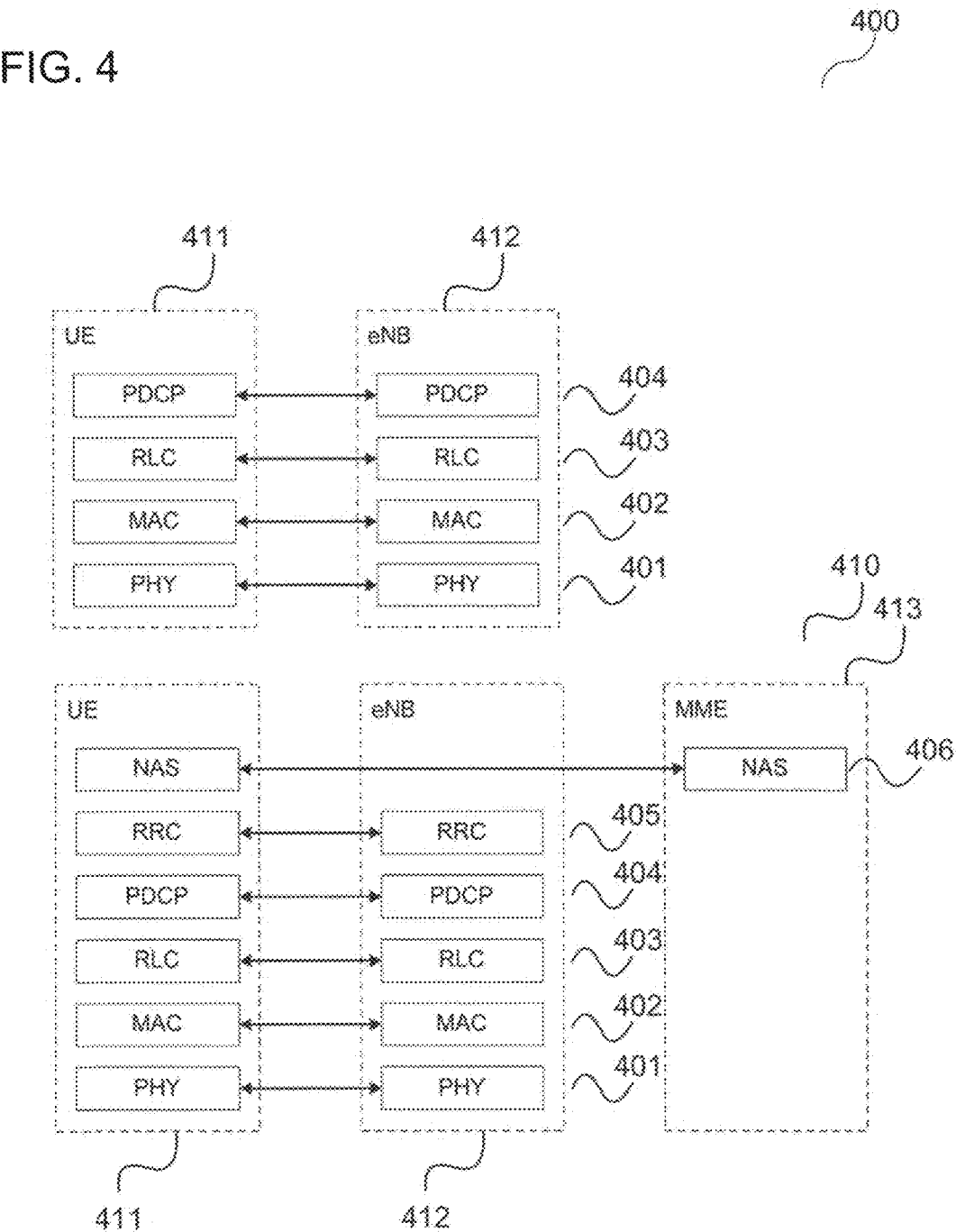
FIG. 4 shows a first protocol structure and a second protocol structure.

Differences between the C-Plane (control plane) 307 and the U-Plane (user plane) 308 according to E-UTRA (LTE) technology are depicted in FIG. 4. The RRC protocol and all lower layer protocols (PDCP, RLC, MAC, and PHY) terminate in the eNB, while the NAS protocol layer 306 terminates in the MME 109 in the EPC 102.

FIG. 4 shows a first protocol structure 400 and a second protocol structure 410.

The first protocol structure 400 corresponds to the U-Plane and the second protocol structure 410 corresponds to the C-Plane.

Analogously to the illustration as shown in FIG. 3, the protocol structures 400, 410 include a physical layer 401, a MAC layer 402, an RLC (Radio Link Control) layer 403, a PDCP layer 404, an RRC layer 405, and a NAS (Non-Access Stratum) protocol layer 406.

In the physical layer 401, the MAC layer 402, the RLC layer 403, the PDCP layer 404, and the RRC layer 405 the terminal points of the communication are the mobile terminal (UE) 411 and the base station (eNB) 412.

In the NAS protocol layer 406, the terminal points of the communication are the UE 411 and the MME 413.

With LTE the UMTS air interface is further optimized for packet data transmission by improving the system capacity and the spectral efficiency. However, the enhancements for LTE technology are not restricted to the air interface. The core network architecture for 3GPP's LTE wireless communication standard is also enhanced. This endeavor is commonly known as SAE (System Architecture Evolution).

SAE refers to the evolution of the GPRS Core Network, with some differences:
simplified architecture;
all IP (Internet protocol) Network (AIPN);
support for higher throughput and lower latency radio access networks (RANs);
support for, and mobility between, multiple heterogeneous RANs, including legacy systems as GPRS, but also non-3GPP systems (e.g. WiMAX);

According to the SAE architecture, the main component is the Evolved Packet Core (e.g. forming the core network of the communication system 100 illustrated in FIG. 1). The Evolved Packet Core (EPC) includes:

A Mobility Management Entity (MME): The MME is the key control-node for the LTE radio access network (E-UTRAN) and, according to LTE, holds the following functions:
NAS signaling;
NAS signaling security;
AS (Access Stratum) Security control;
Inter CN (Core Network) node signaling for mobility between 3GPP access networks;
Idle mode UE Reachability (including control and execution of paging retransmission);
Tracking Area List (TAL) management (for UE in idle and active mode);
PDN GW (Packet Data Network Gateway) and Serving GW selection;
MME selection for handovers with MME change;
SGSN (Serving GPRS (General Packet Radio System) Support Node) selection for handovers to 2G or 3G 3GPP access networks;
Roaming;
Authentication;
Bearer management functions including dedicated bearer establishment;
Support for PWS (which includes ETWS and CMAS) message transmission;
Optionally performing paging optimization.

A Serving Gateway (S-GW): The S-GW holds, according to LTE, the following functions:
The local Mobility Anchor point for inter-eNB handover;
Mobility anchoring for inter-3GPP mobility;
E-UTRAN idle mode downlink packet buffering and initiation of network triggered service request procedure;
Lawful Interception;
Packet routing and forwarding;
Transport level packet marking in the uplink and the downlink;
Accounting on user and QCI (QoS (Quality of Service) Class Identifier) granularity for inter-operator charging;
Uplink and Downlink charging per UE, PDN, and QCI.

A PDN Gateway (P-GW): According to LTE, the PDN Gateway provides connectivity from the UE to external packet data networks by being the point of exit and entry of traffic for the UE. A UE may have simultaneous connectivity with more than one P-GW for accessing multiple PDNs. The P-GW performs policy enforcement, packet filtering for each user, charging support, lawful Interception and packet screening. Another key role of the P-GW is to act as the anchor for mobility between 3GPP and non-3GPP technologies such as WiMAX and 3GPP2 (CDMA 1× and EvDO (Evolution Data Optimized)).

In the following, the network architecture of a communication system (e.g. a 3GPP communication system) with three different Radio Access Networks (RANs) is described with reference to FIG. 5 (for the non-roaming case).

Figure 5:
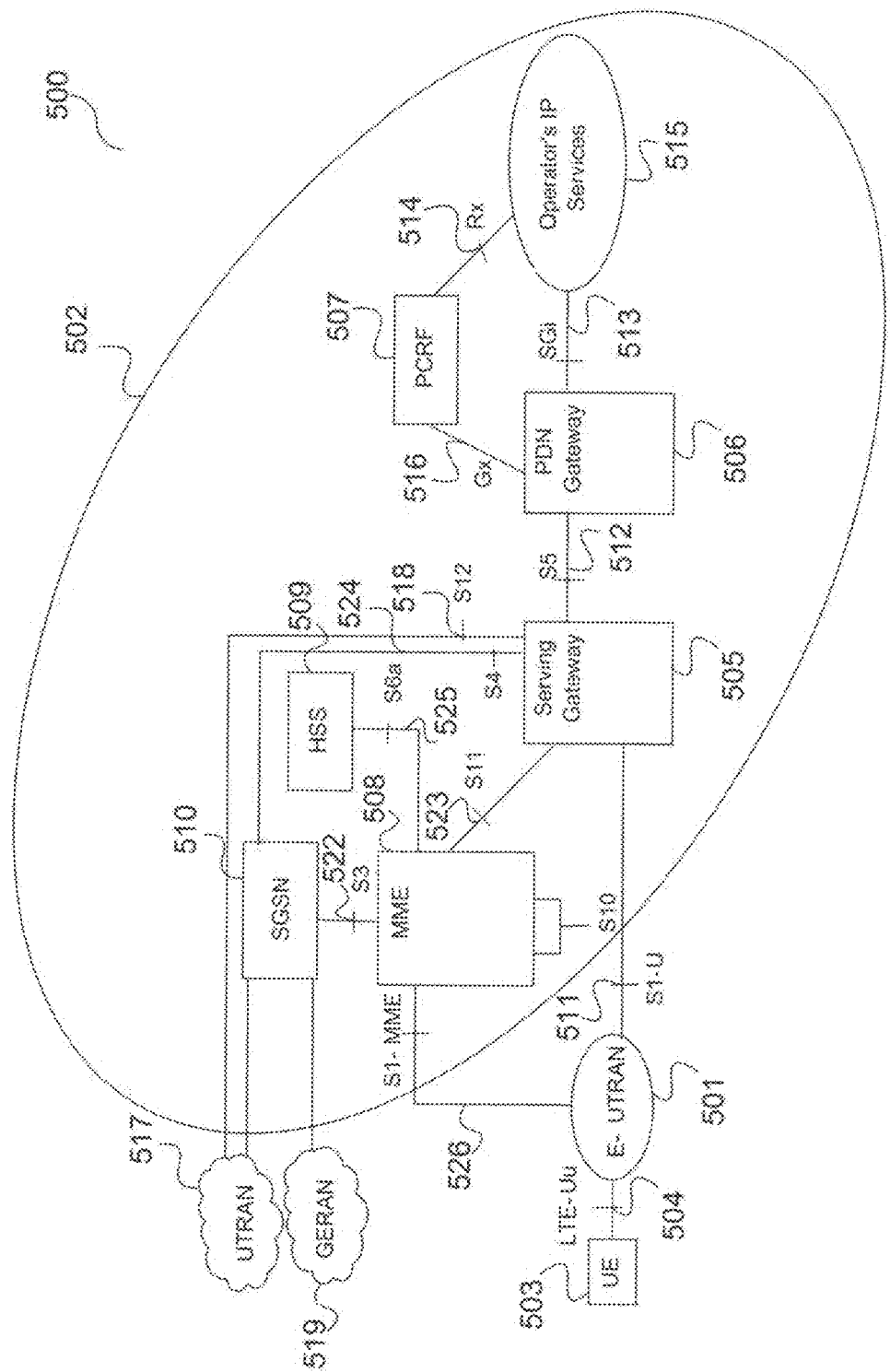
FIG. 5 shows a communication system in more detail.

FIG. 5 shows a communication system 500 according to an aspect of this disclosure.

The communication system 500 includes an E-UTRAN 501 and a core network 502.

The communication system 500 corresponds to the communication system 100 wherein in FIG. 1, the E-UTRAN 101, 501 is shown in higher detail while in FIG. 5, the core network 102, 502 is shown in higher detail.

A mobile terminal 503 which may correspond to the mobile terminal 105 may connect to the E-UTRAN 501 by means of an air interface (Uu interface) 504.

The core network 502 includes a Serving Gateway 505, a PDN (Packet Data Network) Gateway 506, a PCRF (Policy and Charging Rules Function) 507, an MME (Mobility Management Entity) 508, and a HSS (Home Subscriber Server) 509, an SGSN (Serving GPRS (General Packet Radio Service) Support Node) 510.

The E-UTRAN 501 exchanges information or commands with the Serving Gateway 505 by means of an S1-U interface 511. The Serving Gateway 505 is coupled to the PDN Gateway 506 by means of an S5 interface 512. The PDN Gateway 506 and the PCRF 507 may access IP (Internet Protocol) services 515 (i.e. may access, for example, corresponding servers) provided by the operator of the mobile communication system 500 by means of an SGi interface 513 and an Rx interface 514, respectively.

The PCRF 507 is coupled to the PDN Gateway 506 by means of a Gx interface 516. The Serving Gateway 505 is coupled by means of an S4 interface 524 with the SGSN 510. The Serving Gateway 505 may further be coupled to an UTRAN (i.e. a radio access network according to UMTS) 517 via a S12 interface 518. The MME 508 is coupled by means of an S6a interface 525 with the HSS 509. The MME 508 is further coupled by means of an S1-MME interface 526 to the E-UTRAN 501.

The SGSN 510 may support legacy access to the UTRAN 517 and/or a GERAN (GSM (Global System for Mobile Communications) EDGE (Enhanced Data Rates for GSM Evolution) Radio Access Network) 519. The SGSN 510 is coupled with the MME 508 via an S3 interface 522. The Serving Gateway 505 is coupled with the MME 508 via an S11 interface 523.

GERAN is also referred to as 2G and 2.5G. UTRAN is a collective term for the NodeBs and Radio Network Controllers (RNCs) which make up the UMTS radio access network. This communications network, commonly referred to as 3G, can carry many traffic types from real-time Circuit Switched to IP based Packet Switched. The UTRAN includes at least one NodeB (i.e. a UMTS base station) that is connected to at least one Radio Network Controller (RNC). An RNC provides control functionalities for one or more NodeBs. A NodeB and an RNC can be the same device, although typical implementations have a separate RNC located in a central location serving multiple NodeBs. An RNC together with its corresponding NodeBs are called the Radio Network Subsystem (RNS). There can be more than one RNS present per UTRAN.

The E-UTRAN 501 is the 3GPP Radio Access Network for LTE (3.9G) that is currently being worked on. The E-UTRA air interface uses OFDMA for the downlink (i.e. for the transmission direction from the base station to the mobile terminal) and Single Carrier FDMA (SC-FDMA) for the uplink (i.e. for the transmission direction from the mobile terminal to the base station). It employs MIMO (Multiple Input Multiple Output) with up to four antennas per (base and user) station. The use of OFDM enables E-UTRA to be much more flexible in its use of spectrum than the older CDMA based systems, such as UTRAN. OFDM has a link spectral efficiency greater than CDMA, and when combined with modulation formats such as 64 QAM, and techniques as MIMO, E-UTRA is expected to be considerably more efficient than W-CDMA (Wideband Code Division Multiple Access) with HSDPA (High Speed Downlink Packet Access) and HSUPA (High Speed Uplink Packet Access).

Figures 6A, 6B:
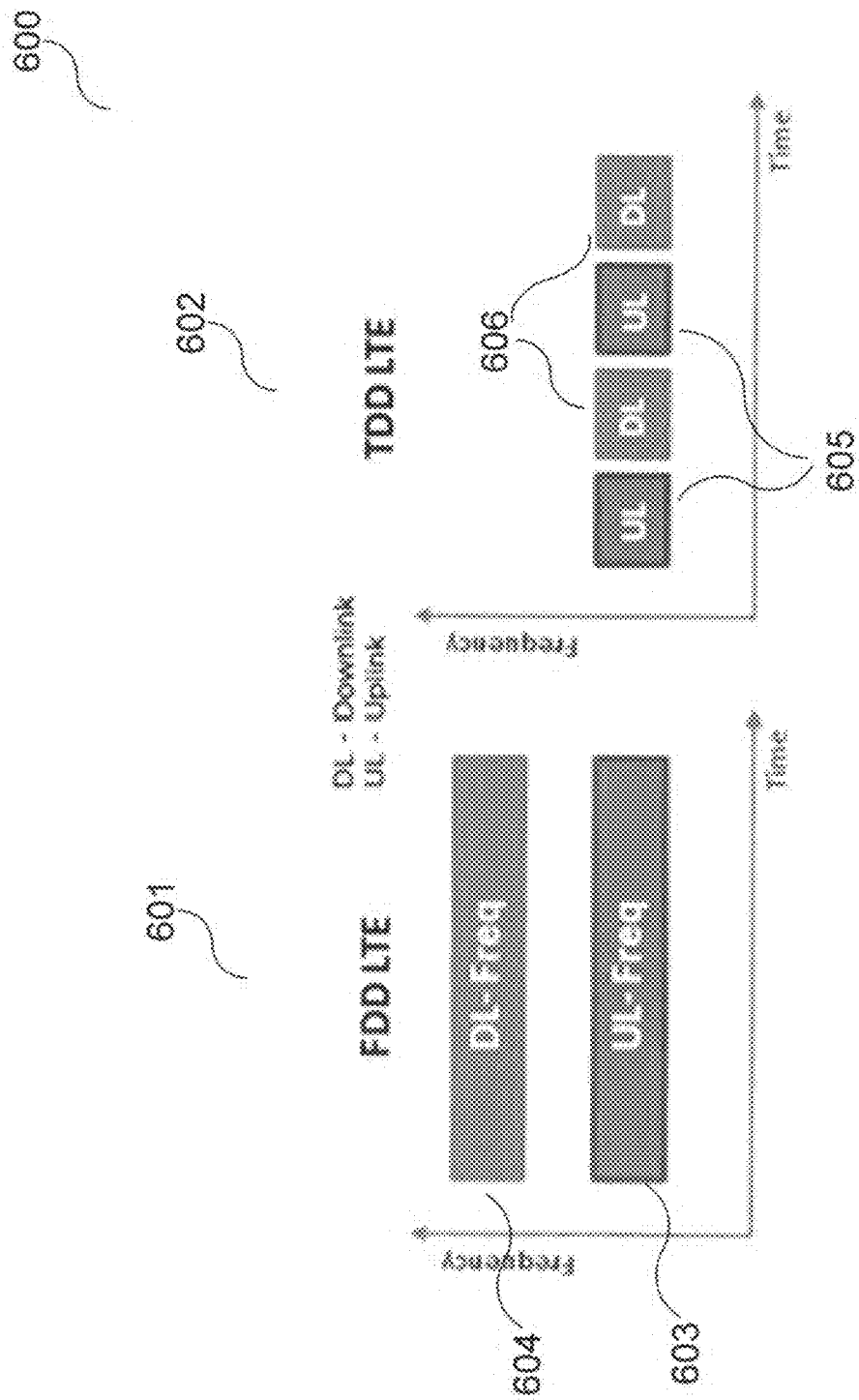
FIGS. 6a and 6b show diagrams illustrating the principles of two duplex methods.

FIG. 6a and FIG. 6b show diagrams illustrating the frequency spectrum described by 3GPP LTE specification. FIG. 6a shows a diagram 601 illustrating the use of Frequency Division Duplex (FDD). FIG. 6b shows a diagram 602 illustrating the use of Time Division Duplex (TDD) to separate uplink (UL) and downlink (DL) traffic. Frequency Division Duplexing (FDD) uses for uplink and downlink a paired spectrum with two distinct frequency bands 603, 604. The downlink frequency band 603 is separated from the uplink frequency band 604. Time Division Duplexing (TDD) uses alternating resource portions for Uplink 605 and Downlink 606 in the same frequency band. In various aspects of this disclosure, Time Division Duplex (TDD) may use alternating uplink portions 605 and downlink portions 606 in the same frequency band as used by the uplink frequency band in the Frequency Division Duplex (FDD) shown in FIG. 6a. In various aspects of this disclosure, the frequency band used for the alternating uplink portions 605 and downlink portions 606 may be the same frequency band as the downlink frequency band used in the Frequency Division Duplex (FDD) method.

Figure 7:
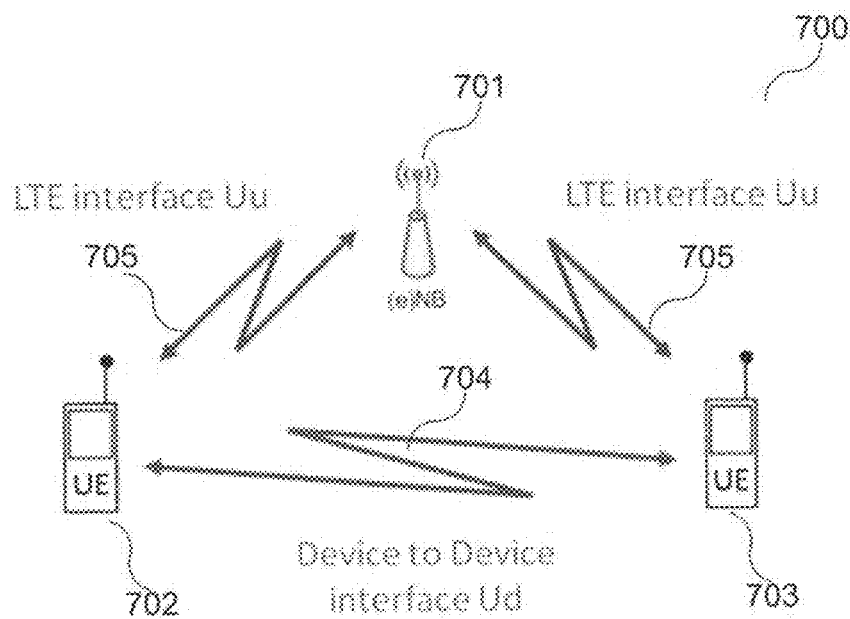
FIG. 7 shows a communication system.

FIG. 7 shows a communication system 700 with a first communication terminal device 702 (UE) and a second communication terminal device 703 (UE) having established a direct communication terminal device to communication terminal device communication connection 704 (D2D) bypassing a radio access network according to an aspect of this disclosure. A base station 701 (eNB), also referred to herein as communication device, may be part of a communication network as described with reference to FIG. 1.

Direct UE-to-UE Communication may also be referred to as "Device-to-Device Communication" or "D2D Communication". There are in principle two alternatives to realize such a direct communication path between mobile devices: the D2D air interface 704 (Ud) may be realized by some type of short range technology, such as e.g. Bluetooth or WiFi, or by re-using the LTE-TDD flavor of the LTE technology.

For direct UE-to-UE Communication TDD has many benefits over FDD (by way of example, the same channel characteristics for the transmission path and reception path can be anticipated, and channel estimation using closed loop principles is not needed, etc.).

By way of example, mobile devices (also referred herein as communication terminal devices) that are residing in coverage of an LTE-FDD cell, and that want to engage in a direct TDD-based UE-to-UE communication in one of the frequency bands of the radio cell are exposed to interference caused by traffic over the Uu interface 705 in this radio cell. At the same time the D2D traffic over the Ud interface 705 sourced by these types of D2D-UEs 702, 703 may also cause some (local) interference in the DL or UL band of the radio cell for other UEs being served over the Uu interface 705.

Alternatively, two UEs 702, 703 in RRC IDLE may be camping on the same base station. At some point in time the two UEs 703, 703 may detect that they are in close proximity and that their D2D technologies would enable direct exchange of data over the Ud interface 704.

Figure 8:
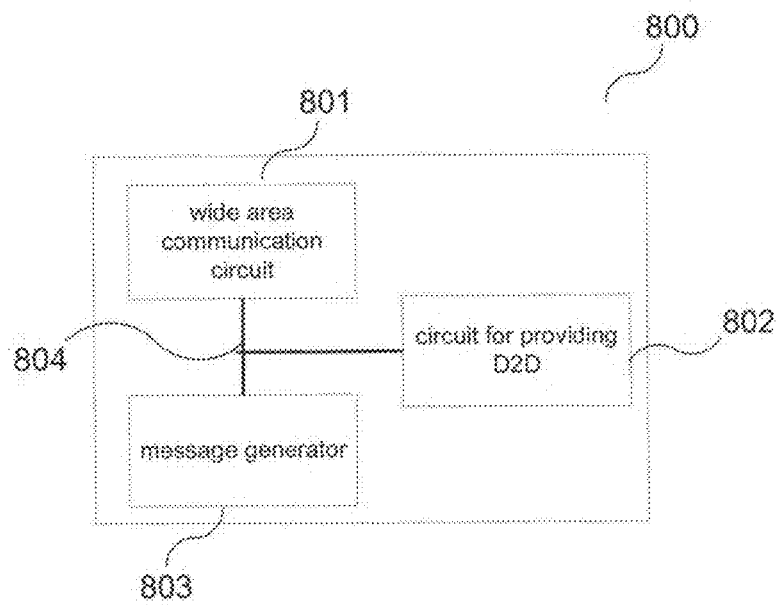
FIG. 8 shows a communication terminal device.

FIG. 8 shows a communication terminal device 800.

The communication terminal device 800 may include a cellular wide area radio communication technology circuit 801. The cellular wide area radio communication technology circuit 801 may be configured to provide a communication according to a cellular wide area radio communication technology. The communication terminal device 800 may further include a circuit 802. The circuit 802 may be configured to provide a direct communication terminal device to communication terminal device communication (D2D) bypassing a radio access network according to information received via the radio access network. The communication terminal device 800 may further include a message generator 803. The message generator 803 may be configured to generate a message to transmit to a base station. The message may include at least one message field specifying information about at least one capability to provide the direct communication terminal device to communication terminal device communication of the communication terminal device. The message may be generated for a network communication protocol. By way of example, the message may be one of an access stratum communication protocol message and a non access stratum communication protocol message. The cellular wide area radio communication technology circuit 801, the circuit 802 and the message generator 803 may be coupled with each other via a connection 804 (e.g. a cable, and the like).

Furthermore, the message may include information indicating whether the communication terminal is capable to provide the direct communication terminal device to communication terminal device communication.

At least one new parameter may be added to the UE-EUTRA-Capability Information Element (IE) defined in E-UTRA User Equipment Radio Access Capabilities. It may further be specified that a mobile device that is capable of direct UE-to-UE communication shall add this parameter to the list of its radio capabilities.

A new parameter may be "D2D-Capable", which indicates that the mobile device is capable of direct UE-to-UE communication. The possible value range for this parameter may be true or false.

The content of the parameter may be as follows:
D2D-Capable::=BOOLEAN

The message may include information indicating what kind of direct communication terminal device to communication terminal device communication the communication terminal is supporting.

A further new parameter may be "Supported-D2D-Technology", which indicates which kind of direct communication terminal device to communication terminal device communication the mobile device may support. The possible value range for this parameter may be WiFi and/or Bluetooth and/or LTE-Direct. If the mobile device does not support D2D, this may be indicated by the absence of this parameter.

The content of the parameter may be as follows:
Supported-D2D-Technology::=ENUMERATED {WiFi, Bluetooth, LTE-Direct}

The message may include information indicating whether the communication terminal device is able to detect a further communication terminal for direct communication terminal device to communication terminal device communication in proximity to it.

The message may include information indicating whether the communication terminal device is capable of providing a direct communication terminal device to communication terminal device communication.

The message may include information indicating whether the communication terminal device is able to engage in direct communication terminal device to communication terminal device communication.

A further new parameter may be "Supported-D2D-Service", which indicates, whether the mobile device is able to detect a further mobile device. The possible value range for this parameter may be Proximity-Detection and/or Communication.

The parameters described above may be used alone or in conjunction which each other. The parameter "Supported-D2D-Service" may be used in conjunction with the previous ones.

The content of the parameter may be as follows:
Supported-D2D-Services::=ENUMERATED {Proximity-Detection, Communication}

A set of D2D related parameters ("container") may be added to the UE-EUTRA-Capability Information Element (IE) and it may be specified that a mobile device that is capable of direct UE-to-UE communication shall add this set of D2D parameters to the list of its radio capabilities.

The new Container D2D-Capabilities with a set of D2D parameters may be as follows:

```
D2D-Capabilities ::= SEQUENCE {
    D2D-Proximity-Detection ::= BOOLEAN;
    D2D-Communication ::= BOOLEAN;
    D2D-and-LTE-in-Parallel ::= BOOLEAN;
    Supported-D2D-Technology ::= ENUMERATED (WiFi, Bluetooth,
        LTE- Direct};
}
```

In the exemplary container detailed above, the parameter D2D-and-LTE-in-Parallel set to "true" may for instance indicate that the mobile device is capable of acting as a mobile relay node. The term "acting as a mobile relay node" may mean, that the mobile device may be capable of sharing its connection over the LTE Uu interface 705 into the core network with other mobile devices it is connected to over the D2D Ud interface 704 for the exchange of user data (for instance at application layer). Likewise, the combination of the parameter D2D-Proximity-Detection set to "true" and the parameter D2D-Communication set to "false" may for instance indicate that the mobile device is capable of detecting the proximity of other mobile devices in its vicinity via D2D technology, but not of exchanging user data at application layer (such as voice or video calls). If proximity to other devices is found the infrastructure elements of the mobile communication network may be informed by the mobile device as configured by the MNO.

As an alternative, the new Container D2D-Capabilities with a set of D2D parameters may be as follows:

```
D2D-Capabilities ::= SEQUENCE {
    WiFi ::= SEQUENCE {
        D2D-Proximity-Detection ::= BOOLEAN;
        D2D-Communication ::= BOOLEAN;
        Version ::= ENUMERATED {802.11, 802.11a, 802.11b,
            802.11g, 802.11h, 802.11n, 802.11ac, 802.11ad}
    }
    Bluetooth ::= SEQUENCE {
        D2D-Proximity-Detection ::= BOOLEAN;
        D2D-Communication ::= BOOLEAN;
        Version ::= ENUMERATED { BT1.0, BT1.0B, BT1.1, BT1.2,
            BT2.0, BT2.0EDR, BT2.1, BT2.1EDR, BT3.0, BT3.0HS,
            BT3.0EDR, BT4.0}
    }
    LTE-Direct ::= SEQUENCE {
        D2D-Proximity-Detection ::= BOOLEAN;
        D2D-Communication ::= BOOLEAN;
        D2D-and-LTE-in-Parallel ::= BOOLEAN;
        Version ::= ENUMERATED {Rel-8, Rel-9, Rel-10, Rel-10CA,
            Rel-11, Rel-11CA, Rel-12, Rel-12CA}
        Supported-Bands-for-D2D ::= ENUMERATED (I, II, III, IV, V,
            VI, VII, . . .}
        D2D-Bandwidth ::= ENUMERATED (n6, n15, n25, n50, n75,
            n100}
        D2D-in-Paired-Spectrum ::= ENUMERATED {LTE-FDD-UL,
            LTE-FDD-DL};
    }
}
```

The encoding details of the parameters discussed in the example above are according to E-UTRA User Equipment Radio Access Capabilities and E-UTRA Radio Resource Control (RRC) Protocol Specification. The UE-EUTRA-Capability IE is commonly used to convey the E-UTRA UE Radio Access Capability Parameters (for optional features) and the Feature Group Indicators (for mandatory features within a feature group) to the NW. It may be transferred in E-UTRA or in another RAT.

Furthermore, the message may be part of a feature group indicator message to the radio access network.

The (mandatory) D2D-Capabilities may at least be partially grouped according to the FGI (Feature Group Indicator) concept in LTE, and—if mandatory—conveyed as part of the Feature Group Indicators (FGI) to the network. All the functionalities defined within the field featureGroupIndicators defined in E-UTRA Radio Resource Control (RRC) Protocol Specification may be mandatory for the UE, if the related capability (for example, frequency band, RAT, SR-VCC or Inter-RAT ANR) is supported.

In case of a signalling by means of the FGI concept the Feature Group Indicator may be as follows:

featureGroupInd BIT STRING (SIZE (32))

For a specific indicator, if all functionalities for a feature group have been implemented and tested, the UE shall set the indicator as one (1), else (i.e. if any one of the functionalities in a Feature Group have not been implemented or tested), the UE shall set the indicator as zero (0). The various "D2D Capabilities" of a mobile device may become part of at least one of the Feature Groups defined in E-UTRA Radio Resource Control (RRC) Protocol Specification.

The short range radio communication circuit may be configured to provide the direct communication terminal device to communication terminal device communication according to one of a Bluetooth radio communication, an Ultra Wide Band radio communication, a Wireless Local Area Network radio communication, and a Long Term Evolution-Direct communication.

The circuit may further be configured to invite and/or add a further communication terminal device to a direct communication terminal device to communication terminal device communication according to information received via the radio access network.

The circuit may further be configured to offer a connection to other communication terminal devices that are connected to the communication terminal device via the short range radio communication circuit to connect into the mobile network operator's core network (e.g. when the communication terminal device is acting as a mobile relay node).

The circuit may be configured to offer a connection to other communication terminal devices that are connected to the communication terminal device via the short range radio communication circuit to connect into the mobile network operator's core network based on information received via the radio access network.

Mobile devices that are capable of engaging in a direct UE-to-UE communication may be enabled to indicate their D2D capabilities to the base station. A first portion of the capability indication may be used directly by the base station (or generally speaking, by an entity of the Radio Access Network (RAN)); another part of capability information may be used to inform corresponding Core Network (CN) entities, such as (in case of LTE) the MME or the HSS, about a UE's D2D capabilities.

The mobile devices' D2D capability information may be used for controlling the formation of D2D clusters, e.g. the NW is enabled to monitor whether an ongoing cellular connection could be handed over to a direct D2D connection.

Furthermore, the mobile devices' D2D capability information may be used for selecting D2D cluster members, e.g. the NW is enabled to distinguish D2D-capable mobile devices from non-D2D-capable devices in mobility procedures, such as handover.

The mobile devices' D2D capability information may be used for adjusting the resource assignment for D2D in a cell according to the mobile devices' capabilities.

For instance, mobile devices (UEs) that are residing in coverage of e.g. an LTE-FDD (Frequency Division Duplex) cell, and want to engage in a direct e.g. TDD-based (Time Division Duplex) UE-to-UE communication (D2D) in one of the frequency bands of said cell may be exposed to interference caused by traffic over the air interface (Uu interface) in this radio cell. At the same time, the D2D traffic over the UE-to-UE interface may also cause some, e.g. local interference for other UEs being served over the Uu interface.

In order to avoid or at least to minimize interferences between UEs or groups of UEs, the UE may further include a controller. The controller may be configured to manage radio resources for a cellular wide area radio communication connection based on radio resources at least one of provided or to be provided for a direct communication terminal device to communication terminal device communication bypassing a radio access network.

The UE (also referred to herein as communication terminal device) may send information to the base station (also referred to herein as communication device), which will help the base station to reserve and assign the right amount and the right type of resources and to select the right periodicity, respectively. Alternatively, the base station may detect interferences on its own. The base station may send a response with the granted resource allocation in one of the cell's frequency bands (e.g., in the DL (downlink) or UL (uplink) band) for D2D communication back to the UE. The base station may for example use explicit or implicit resource allocation rules for informing the UE about free and/or occupied (i.e. used) resources.

In general, the indication of the D2D capabilities to the network is advantageous, as it enables the NW to exploit the benefits of direct UE-to-UE communication more efficiently. The handling of this information among infrastructure elements (RAN and CN), and the definition of new message flows (e.g., early abortion in case a UE is not capable of D2D) to exploit this knowledge in the CN (core network) or in the RAN (radio access network) may allow efficient provisioning of D2D services.

Figure 9:
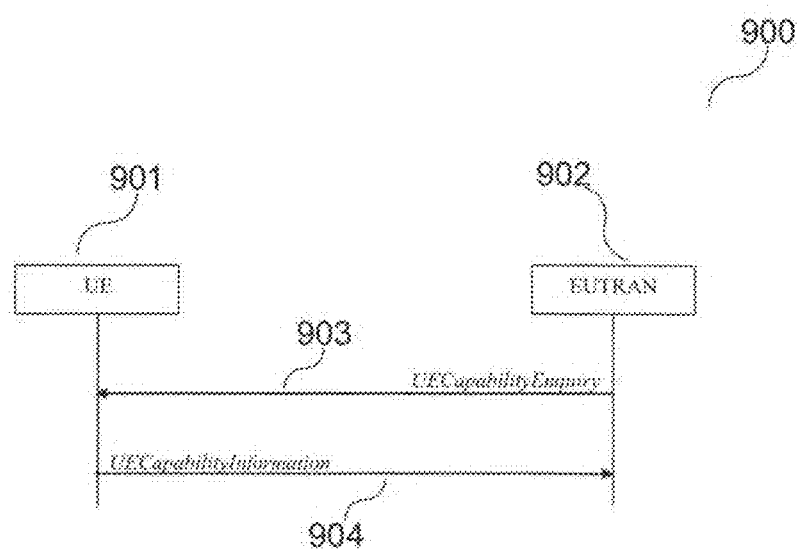
FIG. 9 shows a flow diagram illustrating a UE capability transfer.

FIG. 9 shows a flow diagram 900 illustrating a UE capability transfer.

The procedure for the transfer of UE radio access capability information from the UE 901 to E-UTRAN 902. If the UE 901 has changed its E-UTRAN radio access capabilities, the UE 901 shall request higher layers to initiate the necessary NAS procedures that would result in the update of UE 901 radio access capabilities using a new RRC connection. E-UTRAN 902 initiates the procedure in 903 to a UE 901 in RRC_CONNECTED when it needs (additional) UE radio access capability information. In 904 the UE 902 send back the UE radio access capability information to E-UTRAN 902.

Figure 10:
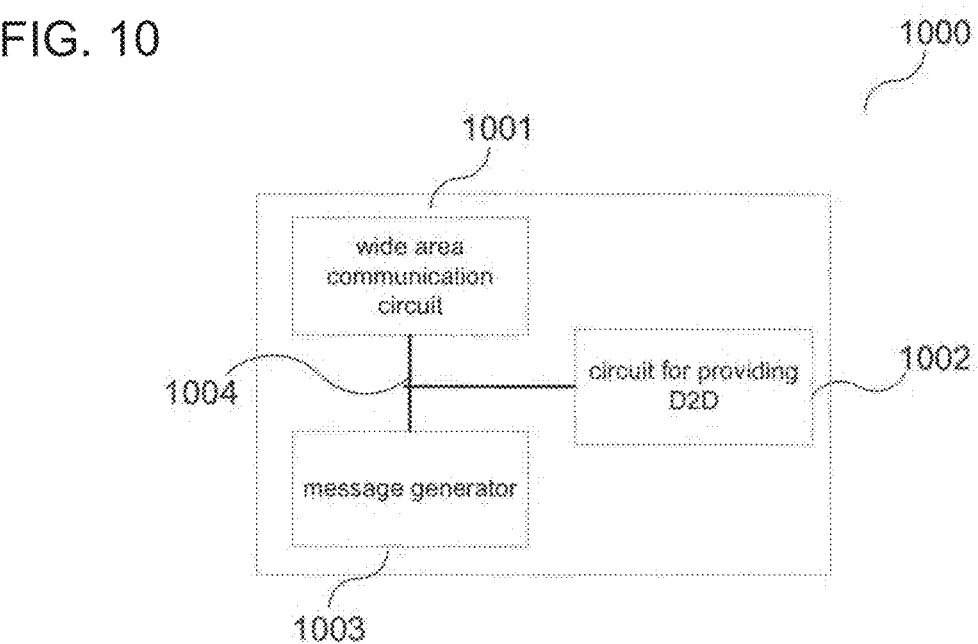
FIG. 10 shows a communication terminal device.

FIG. 10 shows a communication terminal device 1000.

The communication terminal device 100 may include a cellular wide area radio communication technology circuit 1001. The cellular wide area radio communication technology circuit 1001 may be configured to provide a communication connection according to a cellular wide area radio communication technology. The communication connection may be a cellular wide area radio communication connection between the communication terminal device (e.g., a mobile device) and a communication device (e.g., a base station) of a cellular wide area radio communication network. The communication terminal device 1000 may further include a circuit 1002. The circuit 1002 may be configured to provide a direct communication terminal device to communication terminal device communication connection bypassing a radio access network according to information received via the radio access network. The information may include instructions controlling a switching from the direct communication terminal device to communication terminal device communication connection to a cellular wide area radio communication connection, or from the cellular wide area radio communication connection to a direct communication terminal device to communication terminal device communication connection. The communication terminal device 1000 may further include a message generator 1004. The message generator 1004 may be configured to generate a message to transmit to a base station via the radio access network. The message may include at least one message field specifying information about at least one capability to provide the direct communication terminal device to communication terminal device communication of the communication terminal device. The cellular wide area radio communication technology circuit 1001, the circuit 1002 and the message generator 1003 may be coupled with each other via a connection 1004 (e.g. a cable, and the like).

The message may include information indicating whether the communication terminal is capable to provide the direct communication terminal device to communication terminal device communication.

The message may include information indicating which kind of direct communication terminal device to communication terminal device communication the communication terminal is supporting.

The message may include information indicating whether the communication terminal device is able to detect a further communication terminal for direct communication terminal device to communication terminal device communication in proximity to it.

The message may be part of a feature group indicator message to the radio access network.

Furthermore, the short range radio communication circuit may be configured to provide the direct communication terminal device to communication terminal device communication according to one of a Bluetooth radio communication, an Ultra Wide Band radio communication, a Wireless Local Area Network radio communication, and a Long Term Evolution-Direct communication.

The circuit may further be configured to offer a connection to other communication terminal devices that are connected to the communication terminal device via the short range radio communication circuit to connect into the mobile network operator's core network.

The circuit may further be configured to offer a connection to other communication terminal devices that are connected to the communication terminal device via the short range radio communication circuit to connect into the mobile network operator's core network based on information received via the radio access network.

Figure 11:
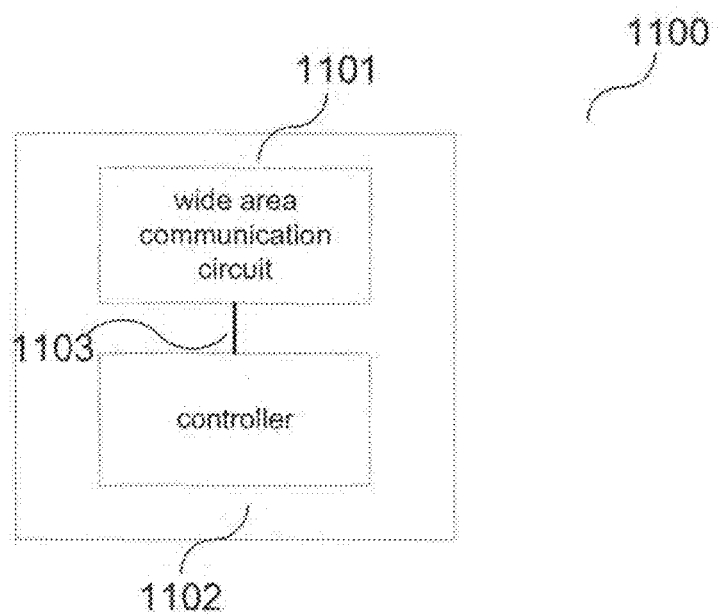
FIG. 11 shows a communication device, e.g. a base station.

FIG. 11 shows a communication device 1100.

The communication device 1100 may include a cellular wide area radio communication technology circuit 1101. The cellular wide area radio communication technology circuit 1101 may be configured to provide a communication according to a cellular wide area radio communication technology. The communication device 1100 may further include a controller 1102. The controller 1102 may be configured to manage a direct communication terminal device to communication terminal device communication bypassing a radio access network based on a message. The message may include at least one message field specifying information about at least one capability to provide the direct communication terminal device to communication terminal device communication of at least one communication terminal device. The cellular wide area radio communication technology circuit 1101 and the controller 1102 may be coupled with each other via a connection 1103 (e.g. a cable, and the like).

The controller may further be configured to extract from the message received from at least one communication terminal device information to be transmitted to a communication network server.

Furthermore, the communication device may further include a storage circuit. The storage circuit may be configured to store information received from a communication terminal device about at least one capability to provide a direct communication terminal device to communication terminal device communication of the communication terminal device.

The controller may further be configured to transmit an initiation message via the radio access network to a first communication terminal device to provide a direct communication terminal device to communication terminal device communication between the first communication terminal device and a second communication terminal device.

The communication device may further include a transmitter. The transmitter may be configured to transmit the initiation message to the first communication terminal device upon a request of a second communication terminal device for a direct communication terminal device to communication terminal device communication.

The storage circuit may further be configured to store information about the capability of the communication terminal devices to provide a direct communication terminal device to communication terminal device communication.

Figure 12:
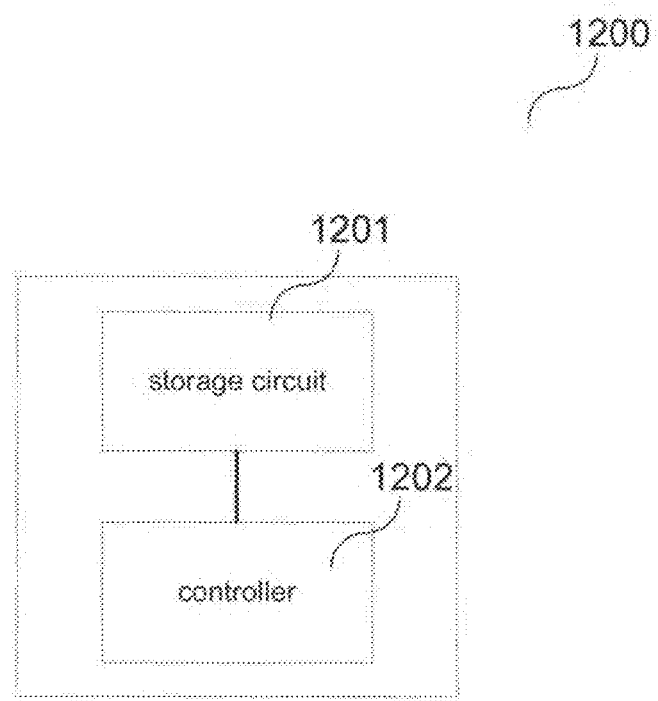
FIG. 12 shows a communication network server.

FIG. 12 shows a communication network server 1200.

The communication network server 1200 may include a storage circuit 1201. The storage circuit 1201 may be configured to store information received from a communication device. The information may relate to user data of a communication terminal capable to provide a direct communication terminal device to communication terminal device communication.

The network server may include a controller 1202. The controller may be configured to manage the storage unit. The controller may further be configured to manage reception and transmission of information at the storage unit.

In various aspects of this disclosure, the network server may be a home subscriber server (HSS).

In various aspects of this disclosure, the network server may be a Mobility Management Entity (MME) such as MME 109 illustrated in FIG. 1.

Figure 13:
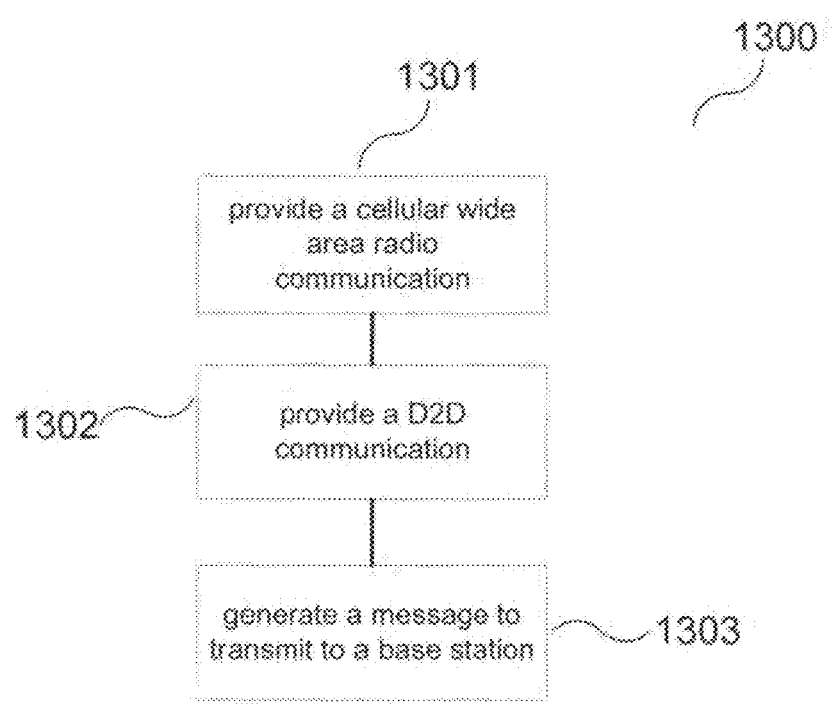
FIG. 13 shows a flow diagram illustrating a method for controlling a communication terminal device.

FIG. 13 shows a flow diagram 1300 illustrating a method for controlling a communication terminal.

The method may include, in 1301, providing a communication according to a cellular wide area radio communication technology. The method may further include in 1302 providing a direct communication terminal device to communication terminal device communication bypassing a radio access network according to information received via the radio access network. The method may further include in 1303 generating a message to transmit to a base station. The message may include at least one message field specifying information about at least one capability to provide the direct communication terminal device to communication terminal device communication of the communication terminal device. The message may be generated for a network communication protocol. By way of example, the message may be one of a non access stratum communication protocol message and an access stratum communication protocol message.

The method may further include indicating whether the communication terminal device is able to detect a further communication terminal for direct communication terminal device to communication terminal device communication in proximity to it.

The method may further include indicating whether the communication terminal is capable of providing the direct communication terminal device to communication terminal device communication.

The method may further include indicating whether the communication terminal device is able to engage in direct communication terminal device to communication terminal device communication.

The method may further include indicating which kind of direct communication terminal device to communication terminal device communication the communication terminal is supporting.

The method may further include indicating whether the communication terminal device is able to detect a further communication terminal for direct communication terminal device to communication terminal device communication in proximity to it.

The method may further include providing the direct communication terminal device to communication terminal device communication according to one of a Bluetooth radio communication, an Ultra Wide Band radio communication, a Wireless Local Area Network radio communication, and a Long Term Evolution-Direct communication.

The method may further include using a time division duplex based communication in the uplink or downlink frequency band of the frequency division duplex based communication, used by the communication device to provide a communication according to a cellular wide area radio communication technology, for the direct communication terminal device to communication terminal device communication.

The method may further include transmitting the information received via the radio access network to the communication terminal upon a request for a direct communication terminal device to communication terminal device communication of a further communication terminal.

The mobile devices' D2D capabilities may be sent from the mobile device (UE) to the Base Station (eNB) in a first step. The mobile device (UE) may be capable of building a data structure for its D2D capabilities including or consisting of multiple components, and of tagging said components for different recipients (for example, a first part of the mobile device's D2D capabilities may be destined for the RAN, while a second part of the data structure may be destined for the CN). The base station (eNB) may be responsible for extracting and storing those parts of the mobile devices' direct UE-to-UE communication capabilities that are related to scheduling and resource assignment in the current cell (and in case of handover also in neighboring cells).

In a second step, the base station (eNB) may send those parts of the mobile devices' direct UE-to-UE communication capabilities that are of general nature and/or related to mobility management (in particular mobility between 3GPP access networks) to the MME (Mobility Management Entity). The HSS (Home Subscriber Server) may be involved in the administration process, too. It may store user data related to D2D. This Data may indicate if the user is generally allowed as per his contract to engage in direct UE-to-UE communication.

The UE Capabilities may for example be used for Proximity Detection. It may be assumed that a given UE is currently residing in RRC IDLE and it may further be assumed that the UE was residing in RRC_CONNECTED before, so that it had an opportunity to indicate its capabilities to the infrastructure side of the mobile communication network (NW).

The NW may decide (e.g., based on an incoming request at higher layers triggered by a connection request from a second UE) that the UE shall perform proximity detection. Before the NW may page the UE to trigger an RRC state transition, the NW may use the mobile devices' direct UE-to-UE communication capabilities stored in the core network (e.g., in the MME or HSS) to find out if the UE in question is capable of D2D proximity detection. If the result of this inquiry is positive, the core network (MME) may kick off the RRC Connection Establishment procedure in the RAN (eNB), so that the UE in question may be requested to perform D2D proximity detection and—if proximity to the second UE was found—may report its findings. If the result of the inquiry is negative, the NW may answer the received request right away, because it may know from the mobile devices' D2D capabilities that D2D may generally be not supported (or that proximity detection is not supported). All the signalling in conjunction with the RRC Connection Establishment procedure in the RAN may thus be avoided and the UE may save a lot of energy.

The UE Capabilities may be used for the formation of a D2D cluster (i.e. a new local D2D network). It may be assumed that a given UE is currently residing in RRC_IDLE and it may further be assumed that the UE was residing in RRC_CONNECTED before, so that it had an opportunity to indicate its capabilities to the infrastructure side of the mobile communication network (NW).

The NW may decide (e.g., based on an incoming request at higher layers triggered by a connection request from a second UE) that the UE in question shall form a new local D2D network. Before the NW may page the UE to trigger an RRC state transition, the NW may use the mobile devices' direct UE-to-UE communication capabilities stored in the core network (e.g., in the MME or HSS) to find out if the UE in question is capable of local D2D network formation. If the result of this inquiry is positive, the core network (MME) may kick off the RRC Connection Establishment procedure in the RAN (eNB), so that the UE in question can be instructed to form a new local D2D network (e.g., with the second UE). If the result of this inquiry is negative, the NW can answer the received request right away, because it may know from the mobile devices' D2D capabilities that formation of a D2D network is generally not supported by the UE in question. All the signalling in conjunction with the RRC Connection Establishment procedure in the RAN can be avoided and the UE may save a lot of energy.

The UE Capabilities may be used for Resource Allocation.

It may be assumed that a given UE is currently residing in RRC_IDLE and it may further be assumed that the UE was residing in RRC_CONNECTED before, so that it had an opportunity to indicate its capabilities to the infrastructure side of the mobile communication network (NW).

The NW may decide (e.g., based on an incoming request at higher layers triggered by a connection request from a second UE) that the UE in question is supposed to engage in direct UE-to-UE communication in an already existing local D2D network. Before the NW may page the UE to trigger an RRC state transition, the NW may use the mobile devices' direct UE-to-UE communication capabilities stored in the core network (e.g., in the MME or HSS) to find out if the UE in question is supporting the frequency band used by the local D2D network. If the result of this inquiry is positive, the core network (MME) may kick off the RRC Connection Establishment procedure in the RAN (eNB), so that the UE in question can be instructed to join the existing local D2D network. If the result of this inquiry is negative, the NW can answer the received request right away, because it may know from the mobile devices' D2D capabilities what D2D frequency bands are supported. All the signalling in conjunction with the RRC Connection Establishment procedure in the RAN to instruct the UE can be avoided and the UE may save a lot of energy.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An apparatus to be implemented in a mobility management entity (MME), the apparatus comprising:
   processor circuitry to control storage of a capability indication that is to indicate whether a user equipment (UE) is capable of direct device-to-device (D2D) communication; and
   communication circuitry communicatively coupled with the processor circuitry, the communication circuitry to transmit a message based on the capability indication, wherein the message is to indicate D2D services that the UE is authorised to use.

2. The apparatus of claim 1, wherein the processor circuitry is to control the communication circuitry to receive subscription data related to D2D from a Home Subscriber Server (HSS), wherein the subscription data related to D2D is to indicate whether the UE is authorised to engage in direct D2D communication.

3. The apparatus of claim 2, wherein the processor circuitry is to control the communication circuitry to transmit the message over an S1 interface when the subscription data related to D2D indicates that the UE is authorised to engage in direct D2D communication.

4. The apparatus of claim 1, wherein:
   the capability indication is to indicate whether the UE is capable of detecting and identifying one or more devices proximate to the UE using Evolved Universal Terrestrial Radio Access (E-UTRA) direct radio signals;
   the capability indication is to indicate whether the UE is capable of exchanging user plane communications with the one or more devices proximate to the UE; or
   the capability indication is to indicate whether the UE is capable of acting as a mobile relay node, and wherein to act as a mobile relay node, the UE is capable of providing a connection into a core network for the one or more devices proximate to the UE for exchange of the user plane communications with the core network.

5. The apparatus of claim 1, wherein the processor circuitry is to obtain the capability indication from a non-access stratum (NAS) message.

6. One or more non-transitory computer-readable media (NTCRM) including instructions that, when executed by one or more processors of a mobility management entity (MME), is to cause the MME to:
   control storage of a received proximity services (ProSe) capability indication that indicates whether a user equipment (UE) is capable of supporting one or more ProSe services; and
   control transmission of a message based on the ProSe capability indication, the message is to indicate that the UE is capable of supporting the one or more ProSe services and the message is to indicate ProSe services that the UE is authorised to use.

7. The one or more NTCRM of claim 6, wherein execution of the instructions is to cause the MME to control receipt of a non-access stratum (NAS) message that includes the ProSe capability indication in a UE Network Capability Information Element (IE) of the NAS message.

8. The one or more NTCRM of claim 6, wherein the one or more ProSe services comprise ProSe Direct Discovery, ProSe Direct Communication, and ProSe UE-to-Network Relay.

9. The one or more NTCRM of claim 8, wherein:
   when the UE is capable of supporting the ProSe Direct Discovery, the UE is capable of detecting and identifying one or more devices in proximity to the UE using Evolved Universal Terrestrial Radio Access (E-UTRA) direct radio signals;
   when the UE is capable of supporting the ProSe Direct Communication, the UE is capable of communicating data between the UE and the one or more devices in proximity to the UE; and
   when the UE is capable of supporting the ProSe UE-to-Network Relay, the UE is capable of relaying traffic from the one or more devices in proximity to the UE through a network to which the UE is attached.

10. The one or more NTCRM of claim 6, wherein execution of the instructions is to cause the MME to:
    control receipt of another message that includes the ProSe capability indication from an evolved NodeB (eNB) over an S1 interface;
    control receipt of, from a Home Subscriber Server (HSS), subscription information related to ProSe, wherein the subscription information is to indicate whether the UE is permitted to engage in ProSe Direct Communication; and
    control transmission of the message based on the ProSe capability indication to the eNB or another eNB.

11. An apparatus to be implemented in a user equipment (UE), the apparatus comprising:
    communication circuitry to transmit a message including a capability indication to a network element, wherein the capability indication is to indicate whether the UE is capable of supporting one or more device-to-device (D2D) services; and
    processor circuitry communicatively coupled with the communication circuitry, the processor circuitry to engage in at least one D2D service of the one or more D2D services with one or more proximate devices according to the one or more D2D services that the UE is capable of supporting and according to D2D services of the one or more D2D services to which the UE is authorised to engage.

12. The apparatus of claim 11, wherein the processor circuitry is to:
    generate the message such that the capability indication is included in an Information Element (IE) of the message; and
    control transmission of the message using non-access stratum (NAS) signaling.

13. The apparatus of claim 11, wherein the processor circuitry is to engage in the direct D2D service using Wireless Local Area Network (WLAN) radio communication or Evolved Universal Terrestrial Radio Access (E-UTRA) direct radio signals.

14. The apparatus of claim 11, wherein the processor circuitry is to:
  engage in the direct D2D service with the one or more proximate devices according to information received from an evolved NodeB (eNB).

15. The apparatus of claim 11, wherein the one or more D2D services comprise:
  D2D proximity detection to indicate that the UE is capable of detecting and identifying the one or more proximate devices;
  D2D communication to indicate that the UE is capable of exchanging data with the one or more proximate devices; and
  D2D relay node to indicate that the UE is capable of providing a connection into a core network for the one or more proximate devices such that the one or more proximate devices are capable of exchanging data with the core network through the UE.

16. One or more non-transitory computer-readable media (NTCRM) including instructions that, when executed by one or more processors of a user equipment (UE) that is enabled for Proximity Services (ProSe), is to cause the UE to:
  control transmission of a first message including a ProSe capability indication to indicate that the UE is capable of supporting one or more ProSe direct services;
  control receipt of a second message from an evolved nodeB (eNB); and
  engage in at least one of the one or more ProSe direct services according to the ProSe capability indication and information contained in the second message and according to authorized ProSe direct services of the one or more ProSe direct services that the UE is authorized to use.

17. The one or more NTCRM of claim 16, wherein the first message is a non-access stratum (NAS) message, and wherein execution of the instructions is to cause the UE to:
  generate the message such that the ProSe capability indication is included in a UE Network Capability Information Element (IE).

18. The one or more NTCRM of claim 16, wherein the one or more ProSe direct services comprise:
  ProSe Direct Discovery to indicate that the UE is capable of detecting and identifying one or more devices in proximity to the UE using Evolved Universal Terrestrial Radio Access (E-UTRA) direct radio signals;
  ProSe Direct Communication to indicate that the UE is capable of communicating data between the UE and the one or more devices in proximity to the UE; and
  ProSe UE-to-Network Relay to indicate that the UE is capable of relaying traffic from the one or more devices in proximity to the UE through a mobile network to which the UE is attached.

19. The one or more NTCRM of claim 18, wherein, when the ProSe capability indication indicates that the UE is capable of the ProSe UE-to-Network Relay, execution of the instructions is to cause the UE to:
  offer a connection to the one or more devices to connect into a core network of the mobile network.

20. The one or more NTCRM of claim 18, wherein, when the ProSe capability indication indicates that the UE is capable of the ProSe Direct Communication, execution of the instructions is to cause the UE to communicate with the one or more devices according to the information contained in the second message.

* * * * *